(12) United States Patent
Krueger (10) Patent No.: US 8,939,141 B2
(45) Date of Patent: Jan. 27, 2015

(54) AIR INTAKE MODULATOR AND METHOD OF USING

(76) Inventor: Gregory Krueger, Eau Claire, WI (US)

( * ) Notice: Subject to any disclaimer, the term of this patent is extended or adjusted under 35 U.S.C. 154(b) by 1255 days.

(21) Appl. No.: 12/820,959

(22) Filed: Jun. 22, 2010

(65) Prior Publication Data

US 2011/0308644 A1    Dec. 22, 2011

(51) Int. Cl.
| | |
|---|---|
| *F23L 13/00* | (2006.01) |
| *F16K 24/06* | (2006.01) |
| *F16K 15/03* | (2006.01) |
| *F16K 17/04* | (2006.01) |

(52) U.S. Cl.
CPC ............ *F16K 24/06* (2013.01); *F16K 15/03* (2013.01); *F16K 17/0413* (2013.01)
USPC ........... 126/77; 126/293; 126/290; 126/307 R (58) Field of Classification Search
CPC ............. F23C 1/00; F23C 1/12; F23L 13/00; F23L 13/10; F23L 111/00
USPC .................. 126/77, 293, 290, 307 R, 312
See application file for complete search history.

(56) References Cited

U.S. PATENT DOCUMENTS

| | | | | |
|---|---|---|---|---|
| 1,048,197 | A | * | 12/1912 | Mueller ........................ 126/293 |
| 2,225,181 | A | | 12/1940 | Powers |
| 2,371,677 | A | * | 3/1945 | Crooker .......................... 236/45 |
| 2,650,029 | A | | 8/1953 | Field |
| 2,687,256 | A | * | 8/1954 | Puffer ............................ 236/45 |
| 2,721,033 | A | | 10/1955 | Elliott |
| 2,818,216 | A | | 12/1957 | Field |
| 3,204,870 | A | | 9/1965 | Dibert |
| 3,273,625 | A | * | 9/1966 | Holtzman et al. .............. 431/20 |
| 3,300,137 | A | | 1/1967 | Murphy |
| 3,774,879 | A | | 11/1973 | Zink |
| 3,805,764 | A | | 4/1974 | Dyer |
| 4,121,562 | A | | 10/1978 | Grott |
| 4,138,062 | A | | 2/1979 | Graden |
| 4,171,089 | A | | 10/1979 | Schossow |
| 4,269,166 | A | * | 5/1981 | Worley et al. ............. 126/285 R |
| 4,329,967 | A | * | 5/1982 | Levenberg ..................... 126/293 |
| 4,335,704 | A | * | 6/1982 | Wingstrom et al. .......... 126/293 |
| 4,404,956 | A | | 9/1983 | Kutzner et al. |
| 4,491,124 | A | * | 1/1985 | Goettel ......................... 126/293 |
| 4,498,624 | A | | 2/1985 | Kogut |
| 5,255,665 | A | * | 10/1993 | Windon ..................... 122/18.31 |
| 5,259,411 | A | | 11/1993 | Guzorek |
| 5,303,897 | A | | 4/1994 | Tengesdal et al. |

(Continued)

OTHER PUBLICATIONS

Johnstone Supply, New Products Now Available at Johnstone Supply Catalog #203, Johnstone Supply Catalog, Jan. 6, 2012, #203.

(Continued)

*Primary Examiner* — Avinash Savani
(74) *Attorney, Agent, or Firm* — Anthony J. Bourget (57) ABSTRACT

An air flow modulating device comprising a flapper, a mount and a conduit. The conduit may be T-shaped and may be attached to an intake conduit of a sealed combustion condensing appliance, or other appliance having an air intake conduit, through a first portion of T-shaped conduit. The mount may be connected to a second portion of T-shaped conduit and the flapper may rotate between an open position and a closed position about an axle of the mount. The device operates to allow for a sealed combustion condensing appliance to immediately intake interior air when an exterior air source is obstructed, limited or reduced, or in response to changes in air pressure due to uncontrollable natural forces.

20 Claims, 7 Drawing Sheets

(56) References Cited

U.S. PATENT DOCUMENTS

| | | |
|---|---|---|
| 5,669,815 A | 9/1997 | Cakebread |
| 6,044,835 A | 4/2000 | Brown et al. |
| 7,451,854 B2 | 11/2008 | Suzuki et al. |
| 8,056,552 B2 * | 11/2011 | Jacklich et al. .................. 126/80 |

OTHER PUBLICATIONS

Unknown, N-take2 says let it snow, let it snow, let it snow, hvac works blog, posted Feb. 13, 2010, 1pg, http://schroyerinc.com/blog/?p=78.

* cited by examiner

AIR INTAKE MODULATOR AND METHOD OF USING

BACKGROUND OF THE INVENTION

1. Field of the Invention

The present invention relates generally to air flow modulating devices, and more specifically to air flow modulating devices that operate mechanically to adjust air flow.

2. Background Information

Air intake terminals and devices are well known. Air intake terminals or devices may be used in conjunction with fuel-fired or sealed combustion condensing appliances, particularly heating appliances. Generally, fuel-fired or combustion heating appliances have intake and venting terminals. These terminals may comprise conduits that have one end attached to the combustion heating appliance and one end connected to an air source external to the area or building being heated by the heating appliance.

Fuel-fired or sealed combustion condensing appliances require a constant draft of air for proper operation and efficient consumption of fuel. The draft through a fuel-fired or sealed combustion condensing appliance may be affected by pressure differences across the appliance. For example, numerous changes in environment may cause pressure changes at, and through, the air intake terminal. Such changes include, but are not limited to, wind induced pressure effects, changes in ambient barometric pressure, debris caught in an intake terminal and/or ice or snow blocking the intake conduit. These environmental changes may be undesirable because they affect the desired pressure differential across the air intake terminal and air venting terminal.

While the prior art has provided examples of features of air intake terminals and devices that people find useful, there is always room for further improvement.

SUMMARY OF THE INVENTION

Although intake terminals and devices may be known for fuel-fired or sealed combustion condensing appliances, the inventor has realized improvements thereon. Applicant has realized that known intake terminals and devices fail to teach intake devices that provide automatic, mechanical and immediate modulation of outdoor to indoor combustion air as needed to minimize fluctuations in a fuel-fired or sealed combustion condensing appliance operation due to inadequate combustion air. Such adjustment may increase the efficiency of the sealed combustion condensing appliance. Applicant has realized the deficiencies of the prior art and has combined the below objectives in a novel manner to provide an intake terminal or device that has been developed for at least the purpose of being able to mechanically, automatically and immediately modulate combustion air from an outdoor source to an indoor source and back again, as needed.

The present invention is directed toward an intake air flow modulating device for sealed combustion condensing appliances using outdoor air for combustion, comprising a T-shaped conduit having concentric cross-sections, a flapper, a mount, an axle and a screw. The T-shaped conduit may be placed on a horizontal or vertical portion of an external air intake conduit in such a manner as the top of the "T" may run along an external air path and the bottom of the "T" may be generally perpendicular to the external air path. A mount may be fit into an end of the bottom of the "T" and the flapper may be connected to an axle located in the mount. The flapper may rotate about the axle. The screw may be inserted into a bottom half of the flapper and may be used to adjust the sensitivity of the flapper to variations in pressure across the air intake conduit.

An object of the invention is to provide an air flow modulating device for installation on, or with, sealed combustion, condensing appliances that use outdoor air for combustion.

An object of the invention is to provide an air modulating device for use with, or on, sealed combustion, condensing appliances having a conduit for the intake of air and a conduit for venting air, where both conduits are connected to an air supply external to an area or building being heated by the appliance.

An object of the invention is to provide an air modulating device that allows for simultaneous modulation of outdoor to indoor combustion air as needed to minimize fluctuations in burner operation and efficiency due to inadequate combustion air.

A further object of the invention is to provide an air modulating device that may be utilized with a sealed combustion, condensing appliance to overcome a frosted or snow blocked intake pipe; debris (e.g., leaves, insects, etc) blocked intake pipe; an increase in static pressure due to direct or indirect wind; and improperly installed piping systems (e.g., systems installed with conduits that are too long or conduits that have too many bends).

A yet further object of the invention is to eliminate temporary nuisance calls for service by allowing the attached appliance to operate although the air intake conduit may be at least partially disrupted.

A yet further object of the invention is to provide an air modulating device that comprises an indicator of normal and compromised combustion air flow to a sealed combustion condensing appliance.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention of the particular embodiments described.

DETAILED DESCRIPTION OF THE INVENTION

The invention, certain embodiments thereof depicted in FIGS. 1-16, is directed to an air modulating device 10 for sealed combustion condensing appliances generally using outdoor air for combustion, comprising a T-shaped conduit 12 having concentric cross-sections, a flapper 20, a mount 24, an axle 26, and a screw 22, and the method of installing and using the device. Sealed combustion condensing appliances may be appliances that burn fuel for warm air heating, (i.e., such as a furnace 110), water space heating, water heating, boiler heating, radiant heating, warmth, cooking, decorative purposes or other purposes. Typical fuels burned by combustion appliances may include gas (i.e., natural gas and liquefied petroleum), kerosene, oil, coal, wood and other combustibles. Device 10 is especially useful in environments that require a condensing action. Appliances that operate by venting gas that is relatively cool, i.e., no more than approximately 140 degrees Fahrenheit above the dew point (i.e., a typical condensing appliance) are well suited for use of device 10. Such appliances typically have a blower to assist in the combustion action. A condensing action assists in lowering the temperature of vented gases. Since temperatures are relatively low with a condensing appliance, a device such as device 10 may be made from plastic such as PVC and endure the relatively modest temperatures. Typically the maximum temperature when using PVC is 158 degrees, for using ABS is 180 degrees, and for using CPVC is 212 degrees Fahrenheit. Appliances that operate from wood or coal or oil typically do not use condensing units since the temperatures are too high (i.e., the flu temperature with an oil burner may be as high as 300 degrees Fahrenheit or greater). Appliances that operate on LP and natural gas/methane or other gas typically have condensing units so the exhaust air is relatively cool. With condensing and/or pressurized systems, automatic adjustment of the flows of gasses is desired. Applicant appreciates that automatic adjustment of device 10 allows for improved air flow and improves the overall efficient operation of the appliance.

Figure 14:
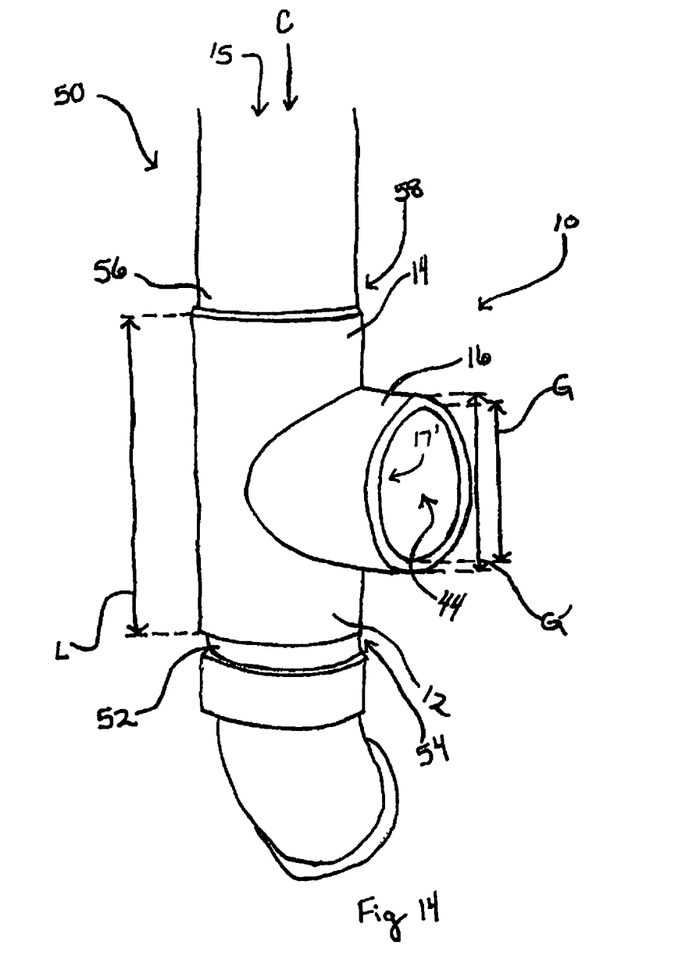
FIG. 14 is a perspective view of a portion of an embodiment of the invention.
Figure 15:
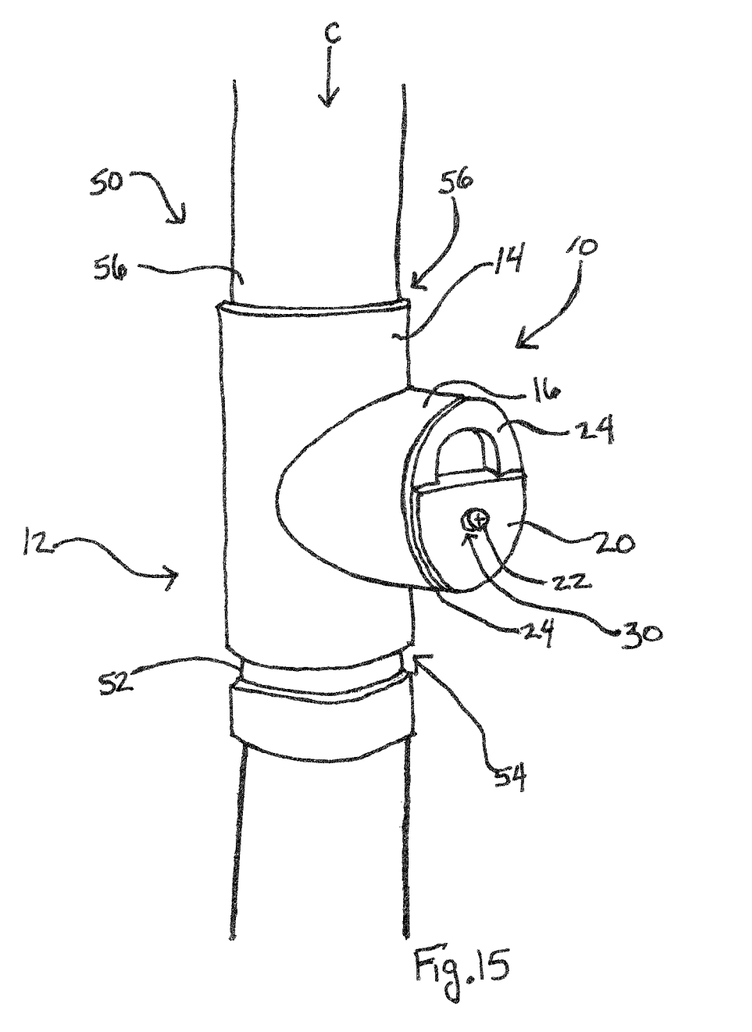
FIG. 15 is a perspective view of an embodiment of the invention.
Figure 16:
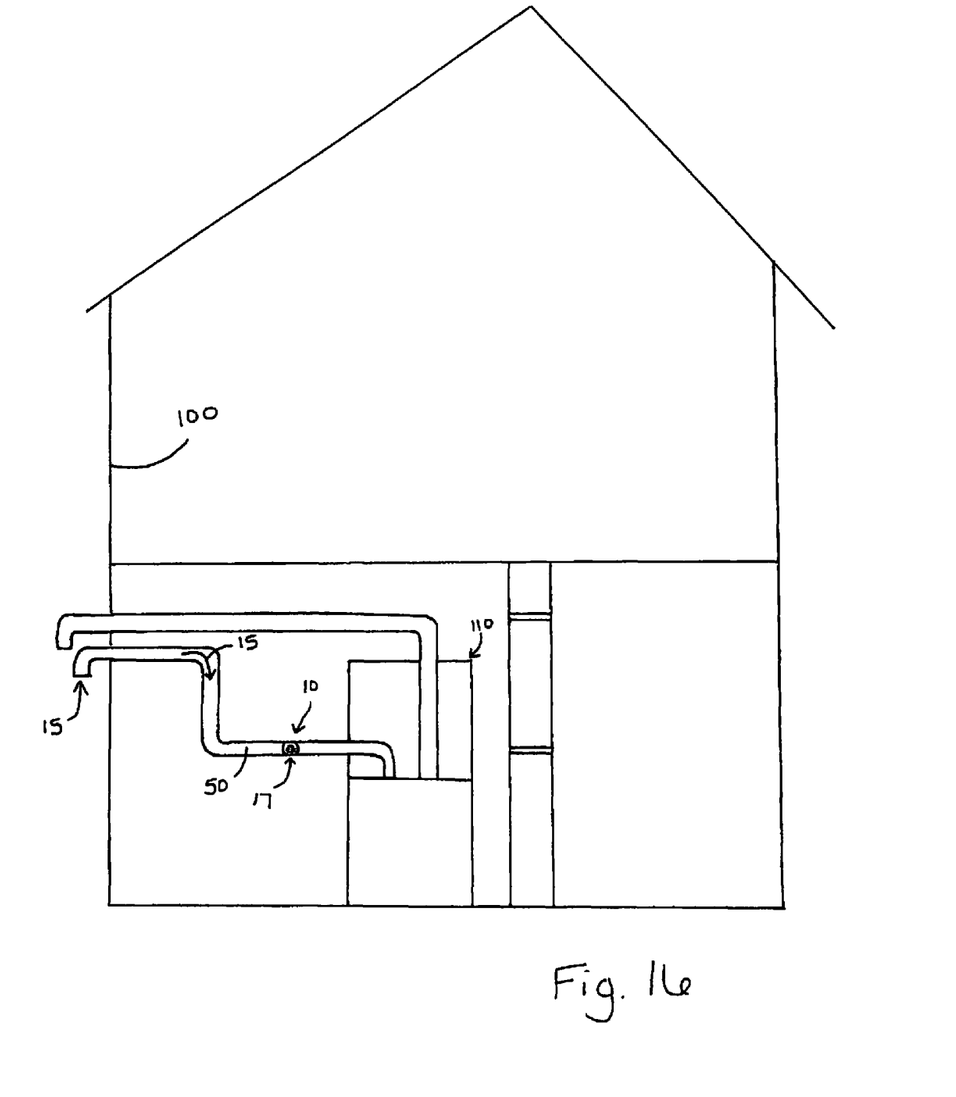
FIG. 16 is an elevation view of a structure depicting features of the invention.

As seen in FIGS. 14, 15 and 16, T-shaped conduit 12 of device 10 may be placed on a horizontal or vertical portion of an external (combustion) air intake conduit 50 in such a manner as a top of the "T" may have a first air flow intake path 15' generally along an external air path 15 flowing therethrough and a bottom of the "T", substantially perpendicular to the top, may have a second air flow intake path 17' (see FIG. 1 and FIG. 14) along an internal air flow path 17. "External" means external to a structure 100 which surrounds device 10 and "internal" means internal to the structure 100 surrounding device 10. In operation, when a first air intake conduit (e.g., a conduit 50 receiving external air) encounters any situation that limits or obstructs the intake air volume for the combustion appliance, such as furnace 110, the device 10 may operate to allow a sealed combustion condensing appliance to intake air from a second intake conduit (e.g., a conduit receiving internal air).

Figure 1:
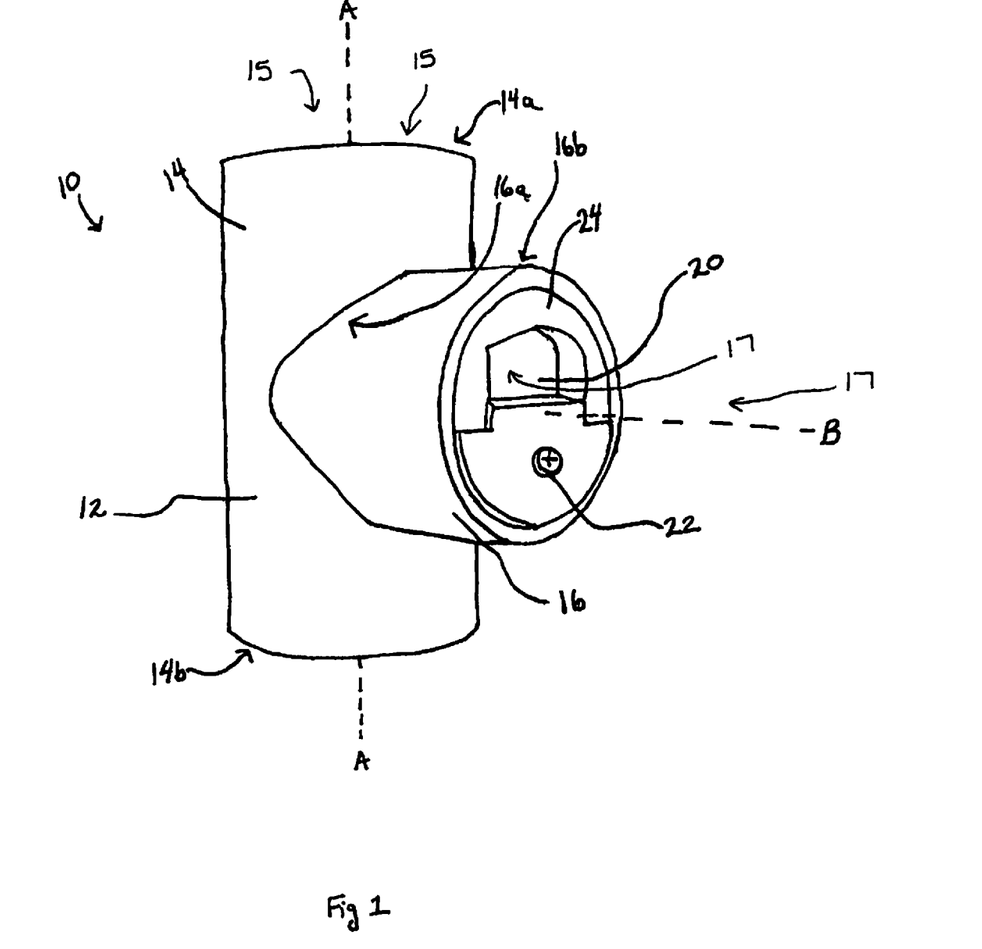
FIG. 1 is a perspective view of an embodiment of the invention.
Figure 2:
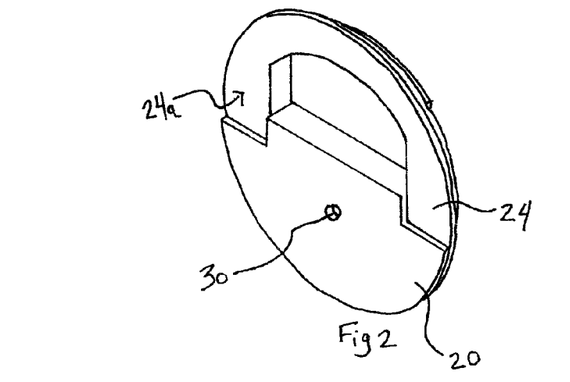
FIG. 2 is a perspective view of features of the invention.
Figure 3:
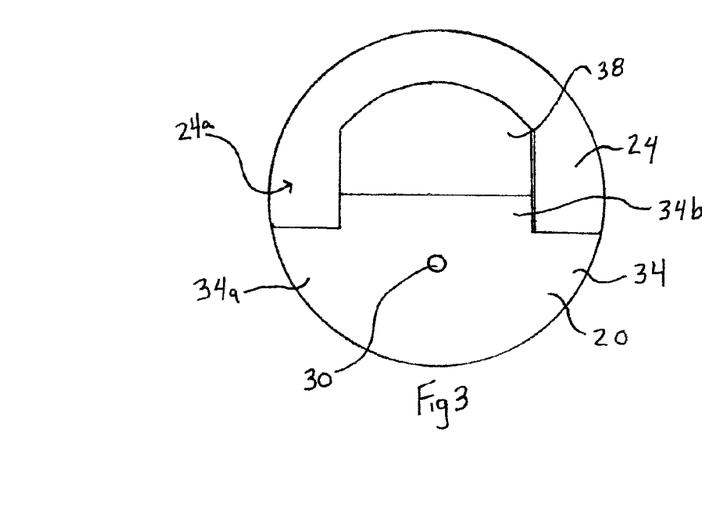
FIG. 3 is a front view of the features of the invention shown in FIG. 2.
Figure 4:
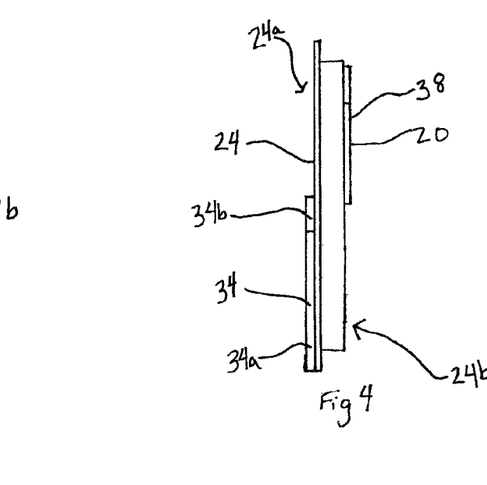
FIG. 4 is a side view of the features of the invention shown in FIG. 2.
Figure 5:
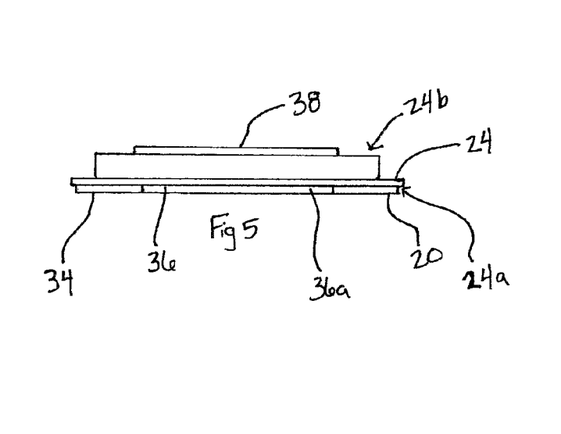
FIG. 5 is a top view of the features of the invention shown in FIG. 2.
Figure 6:
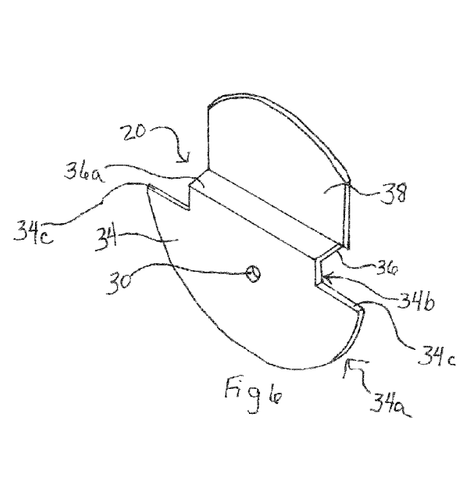
FIG. 6 is a perspective view of features of the invention.

As seen in FIG. 1, air modulating device 10 may comprise a T-shaped conduit 12, a flapper 20 and a mount 24. T-shaped conduit 12 may have a first portion 14 that may be concentric along axis A and a second portion 16 that may be concentric along axis B. Axis A may be substantially perpendicular to Axis B. Although conduit 12 is depicted as T-shaped in FIG. 1, conduit 12 may take on any shape or size, or may be made of any number of pieces of conduit or piping. T-shaped Conduit 12, itself, may be of a single molded piece of material or may be two or more conduits or piping or tubing connected together to form the general T-shape or other shape. Further, first portion 14 of T-shaped conduit 12 may be integrally formed with a further conduit at least partially having a concentric axis along axis A and drawing air from an external air source (e.g., an external air source may be a source of air located external to an area or building 100 surrounding the sealed combustion condensing appliance in communication with the air modulating device 10), or first portion 14 may be connected to the further conduit(s) at least partially having a concentric axis along axis A and drawing air from the external air source. Such further conduit(s) at least partially having a concentric axis along axis A may at least partially form a combustion air (i.e., intake) pipe for the sealed combustion condensing appliance. First portion 14 may have a first end 14a and a second end 14b, generally separated by any length; for example, length L. Conduit 12 and any other conduits may be made of any material; for example, conduit 12 and other conduits may be made of polyvinyl chloride ("PVC").

Second portion 16 of T-shaped conduit 12 may be at least substantially perpendicular to first portion 14. In alternative aspects second portion 16 may have a concentric axis B that is not generally perpendicular to axis A. Second portion 16 may communicate with an interior air source (e.g., an interior air source may be a source of air located internal to an area or building 100 surrounding the sealed combustion condensing appliance that is in communication with the air modulating device 10) and have an inner diameter, G. At a first end 16a, second portion 16 may be connected, or integrally formed, with first portion 14. At a second end 16b, which may form a plane substantially perpendicular to axis B, a mount 24 may be fitted into an opening 44 of T-shaped conduit 12. A diameter of mount 24 may be substantially equal to or less than an inner diameter of second portion 16. Further, a glue or adhesive or other sealant may be used to secure mount 24 to an interior of second portion 16. For example, a room temperature vulcanization ("RTV") type sealant may be applied to an inner circumference of second end 16b of second portion 16 and mount 24 may be held securely in place with the applied RTV sealant. In alternative aspects mount 24 may be secured to an exterior of second portion 16.

Figure 10:
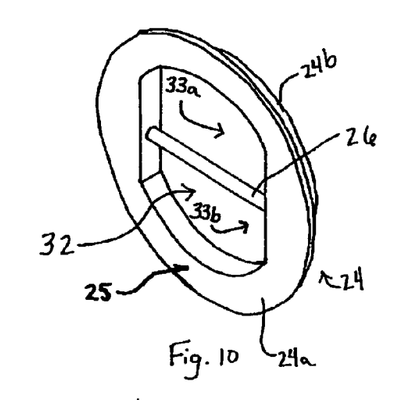
FIG. 10 is a perspective view of features of the invention.
Figure 11:
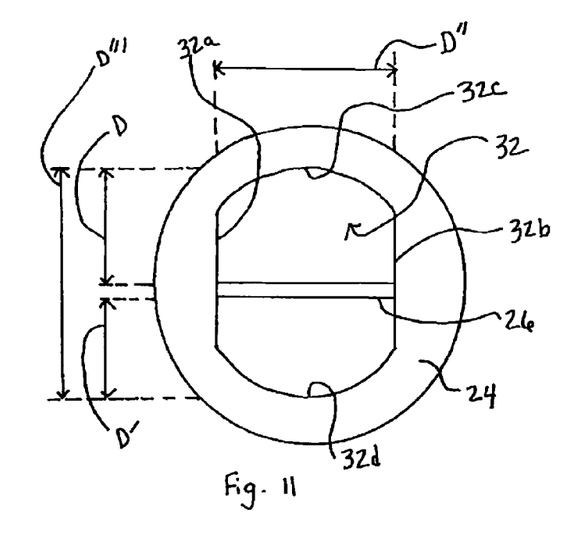
FIG. 11 is a front view of the features of the invention shown in FIG. 10.
Figure 12:
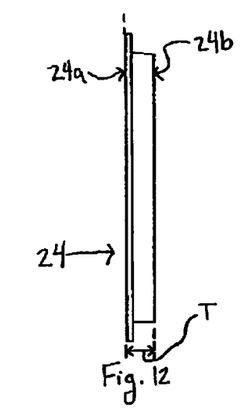
FIG. 12 is a side view of the features of the invention shown in FIG. 10.
Figure 13:
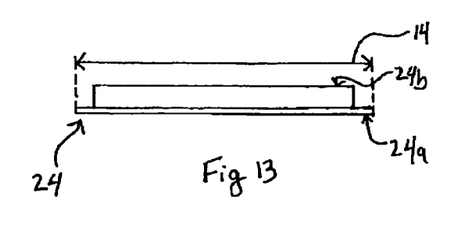
FIG. 13 is top view of the features of the invention shown in FIG. 10.

Mount 24 combined with flapper 20 may operate with second portion 16 to modulate intake flow from an exterior source of air to an interior source of air or a combination thereof, as shown in FIGS. 1 and 15. FIGS. 10, 12 and 13 depict mount 24 with an exterior portion 24a and an interior portion 24b and a thickness T, therebetween. Exterior portion 24a may have a width or diameter M, which may be substantially equal in measurement to outer width or diameter G' of second portion 16 (depicted in FIG. 14). Mount 24 may have a mount opening 32 and an axle 26 spanning from a first side 32a of mount opening 32 to a second side 32b of mount opening 32. For example, and as depicted in FIGS. 10 and 11, mount opening 32 may be defined by first side 32a, second side 32b, third side 32c and fourth side 32d. Mount opening 32 may have a distance D" between first side 32a and second side 32b and distance D" may vary along opening 32. Further, mount opening 32 may have a distance D'" between third side 32c and fourth side 32d and distance D'" may vary along opening 32. Axle 26 may be off-centered with respect to mount opening 32 and a general inner diameter of second portion 16. For example, as seen in FIG. 11, a distance D from axle 26 to a third side 32c of mount opening 32 may be greater than a distance D' from axle 26 to a fourth side 32d of mount opening 32. In the example, third side 32c may be a top side of mount opening 32 with respect to axle 26 and fourth side 32d may be a bottom side of mount opening 32 with respect to axle 26. Further, although sides 32a-d may take on any shape, sides 32a and 32b may be generally parallel, and sides 32c and 32d may generally form arcs, as shown in FIGS. 10 and 11. Yet further, sides 32c and 32d may be generally concave with respect to a viewing point at axle 26.

Figure 7:
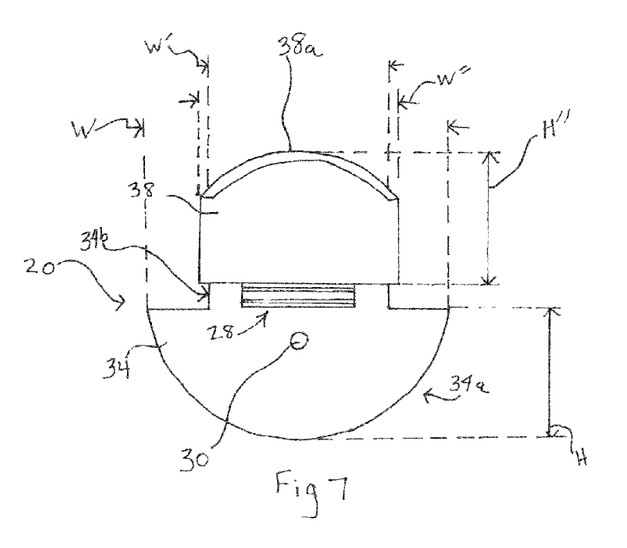
FIG. 7 is a back view of the features of the invention shown in FIG. 6.
Figure 8:
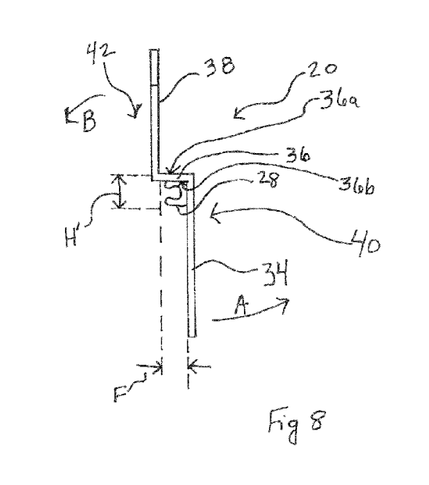
FIG. 8 is a side view of the features of the invention shown in FIG. 6.
Figure 9:
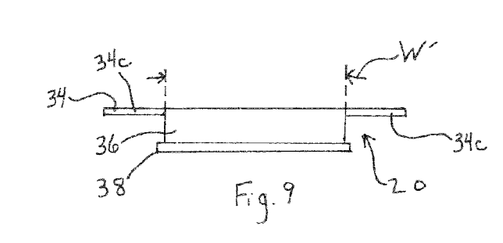
FIG. 9 is a top view of the features of the invention shown in FIG. 6.

Flapper 20, having a front side 40 and a back side 42, may attach to mount 24 by any known connection means. For example, as depicted in FIGS. 7 and 8, connection means for attaching flapper 20 to mount 24 may include an axle snap 28 on a back side 42 of flapper 20, where axle snap 28 may snap to axle 26 and allow flapper 20 to rotate about axle 26. Axle snap 28 may abut an apron 34 and a neck 36 of flapper 20, as seen in FIG. 8. Axle snap 28 may be integrally formed with flapper 20 if desired. Axle snap 28 is configured to snap onto, or be friction fitted with, axle 26. It may be appreciated that flapper 20 may be snapped onto mount 24 by pressing flapper 20 onto mount 24 at axle snap 28. Axle snap 28 may have resilient portions to allow for a snapping action. Axle snap 28 preferably includes curved surfaces in order to efficiently rotate about or on axle 26. The connection means used to connect flapper 20 to mount 24 may be any connection means that is capable of allowing flapper 20 to rotate about an axis. For example, as an alternative to, or in combination with, flapper 20 connecting to axle 26, flapper 20 may connect to sides 32a, 32b of mount 24 or other portions of mount 24 that allow flapper 20 to rotate about an axis.

Flapper 20 may rotate about axle 26 to any number of positions. Flapper 20 may be considered to be in an open position when air is flowing through mount opening 32. Flapper 20 may be considered to be in a closed position when both apron 34 and apron riser 38 of flapper 20 are in contact with mount 24. During the closed position, air may be substantially blocked from passing through mount opening 32. Flapper 20 may rotate from a first or closed position to a second or open position in response to a change in pressure level of intake conduit 50. The change in pressure level may be from a first pressure level to a second pressure level. Intake air that is flowing into the apparatus and through intake pipe 50 flows in the intake direction as shown with reference to arrow C of FIG. 14.

Flapper 20 may be of any shape, size and material capable of providing an air-tight covering of mount opening 32 and rotating about an axis. Further, flapper 20 may be of any uniformity; for example, and preferably, flapper 20 may be generally uniform in thickness and weight and may have a generally flat surface. In alternative aspects the thickness of flapper 20 may vary throughout. As depicted in FIGS. 6-9, an example of a structure of flapper 20 may comprise an apron 34 (e.g., an "apron"), a neck 36 and an apron riser 38. Apron 34, neck 36 and apron riser 38 may be integrally formed or connected by any known connection technique. Apron 34 and apron riser 38 may be spaced apart a distance F and neck 36 may bridge the distance F between apron 34 and apron riser 38. Apron 34 and apron riser 38 may be at any angle with respect to the other; for example, apron 34 and apron riser 38 may be substantially parallel with respect to the other part. Neck 36 may form any angle(s) with respect to apron 34 and apron riser 38; for example, when apron 34 and apron riser 38 are substantially parallel to the other, neck 36 may be substantially perpendicular to apron 34 and apron riser 38. Further, the angle between apron 24 and neck 36 may differ from the angle between neck 36 and apron riser 38.

Parts 34, 36, 38 of flapper 20 may be any shape or size capable of covering mount opening 32. As depicted in FIGS. 7 and 8, apron 34 may have an arc portion 34a with a height H and width W. Width W of arc portion 34a may be greater than distance D". Apron 34 may have an apron extension portion 34b extending from arc portion 34a, where apron extension portion 34b has a height H' and width W'. Width W' may be equal to or less than distance D". Apron 34 may have any height substantially equal to height H plus height H'. Apron extension portion 34b may be integrally formed with, or connected to, arc portion 34b. Apron 34 may also comprise at least one adjuster hole 30. Adjuster hole 30 may be threaded and may operate to receive an adjuster or adjustment screw 22 (e.g., a threaded screw).

Neck 36 may extend from apron extension portion 34b, or other portion, of apron 34. Neck 36 may have a width W' or a width less than or equal to width W' and neck 36 may span a distance F (See FIG. 7 and FIG. 8). Distance F may be substantially equal to thickness T, which may contribute to allowing flapper 20 to create an airtight seal with mount 24 when flapper 20 is in a closed position. Neck 36 may have any height capable of providing a structural connection between apron 34 and apron riser 38. Neck 36 may have a top side 36a and a bottom side 36b. Top side 36a may include an indicator to indicate proper operation of the appliance. For example, top side 36a may be painted a first color (e.g. green) for the purpose of indicating air intake conduit and the sealed combustion condensing appliance are operating under normal operation conditions. Alternatively top side 36a may be made of a colored plastic in order to operate as an indicator. Generally, the indicator on top side 36a is viewable when flapper 20 is in a closed position.

As shown in FIGS. 2, 3 and 6-9, apron riser 38 may extend from neck 36. Apron riser may have a height H" and a width W'. Width W" may be any width; for example, a width W'" may be greater than W' and less than width W. Further, width W" may be greater than distance D". Height H" may be any height; for example, a height H" may be greater than distance D. The heights and widths of apron 34 and apron riser 38 may be designed to cover at least mount opening 32. For example, the height of flapper (i.e., the sum of H, H' and H") may be greater than distance D'" and both widths W, W" may be greater than distance D". Apron riser 38 may have a covered portion 38a. Covered portion 38a may be a portion of apron riser 38 that is covered by mount 24 when flapper 20 is in a closed position and at least partially viewable when flapper 20 is in an open position. Covered portion 38a may include an indicator. For example, covered portion 38a may be colored (e.g., colored red) and indicate a situation where intake conduit is at least partially blocked, obstructed or not operating properly (i.e., when such obstruction occurs, flapper 20 rotates due to changes in air intake pressure, thus exposing an alert indicator that is presented on at least part of covered portion 38a). Mount 24 may also include an indicator portion represented by reference numeral 25 as shown in FIG. 10. When flapper 20 rotates, indicator portion 25 is exposed. The greater the rotation of flapper 20, the greater the exposure of indicator 25. Typically flapper 20 would have to rotate a relatively great angle in order for indicator 25 to be exposed to the view of a person that is standing. When flapper 20 rotates a large angle, the amount of blockage would typically be very great or even extreme, thus warranting an indicator. In further aspects, multiple indicators may be used in conjunction, where different colors are selected. For instance, a green indicator may be positioned at 36a to signify normal operation, a yellow indicator at 38a as a cautionary indication, and a red indicator at 25 as an emergency or alert. Alternative indicator means may also be used. Other types of indicators may be utilized to signal a user that a source of exterior air flow through intake conduit 50 may be at least partially obstructed. For example, another type of indicator may be a mechanical indicator such as a whistle that is heard when interior air flows through second portion 16 at a specified rate. The other type(s) of indicator(s) may be located at any advantageous location of device 10.

Connection of Device 10 to a Sealed Combustion Condensing Appliance

Air modulating device 10 may be installed with a conduit system when a sealed combustion condensing appliance is initially installed in a building, or air modulating device 10 may be retrofitted and installed on an already existing conduit system of a previously installed sealed combustion condensing device. Further, device 10 may be used on vertical or horizontal piping or conduit systems associated with sealed combustion condensing appliances.

Device 10 may be installed by locating a combustion pipe (i.e., an intake pipe) 50. Intake or combustion pipe 50 may be located by checking an installation manual for the location of that pipe or by operating the sealed combustion condensing appliance (not shown) connected with the conduit system and ensuring which conduit is allowing air into the sealed combustion condensing appliance. It may be possible to determine which conduit is allowing air into the sealed combustion condensing appliance by placing a hand or other object over an exterior end (not shown) of conduit 50 and confirming the conduit is sucking air into the sealed combustion condensing appliance. Prior to installing device 10, but after intake conduit 50 has been located, it may be necessary to ensure the sealed combustion condensing appliance is not operating.

Device 10 may be installed along intake conduit 50 at any location. If device 10 is to be installed in a sealed combustion condensing appliance retrofitting process, the process may begin by marking the existing conduit 50 twelve to twenty inches from the attached sealed combustion condensing appliance (e.g., the conduit 50 may be marked twelve to twenty inches above the attached sealed combustion condensing appliance, assuming the intake conduit is positioned above the appliance input location). This location may allow an installed device 10 to be located at or near eye level. A first cut may be made at this mark using any known cutting means. For example, a PVC saw or hacksaw may be utilized to make the cut and any other required cuts. A second mark and a second cut may be made on the intake conduit at a position farther away from the sealed combustion condensing appliance than the first mark and cut. The distance between the first mark and the second mark may be any distance greater than the length of an inner diameter G of second portion 16 of T-shaped conduit 12 and less than length L of first portion 14 of T-shaped conduit 12, as seen in FIG. 14. Once the first cut and the second cut have been made, a piece of intake conduit 50 may be removed and that piece may be discarded. The remaining ends of conduit 50 that received the first two cuts may be deburred and any loose material may be removed from the sealed combustion condensing appliance location and piping. Such removal may be accomplished through a vacuuming technique or other removal process.

After making the first two cuts and removing pieces of intake conduit 50, intake conduit 50 may be checked for the purpose of verifying intake conduit 50 is free of any debris along the entire length from the second cut to an exterior end of the conduit 50. Such check may be accomplished by pushing an object (e.g., a cloth) through conduit 50 from the second cut to the outdoors with a flexible tool (e.g., a fish-tape), sucking and removing debris in the conduit 50 by use of a vacuuming technique, blowing air through conduit 50 to push debris through conduit 50 to an exterior location, or by any other known debris removal or check technique.

After ensuring all debris is removed from intake conduit 50 and the areas around the sealed combustion condensing appliance, device 10 may be installed on intake conduit 50. RTV silicone sealant, or other similar sealant, may be applied to a free end 54 of a portion 52 of intake conduit 50 connected to the sealed combustion condensing appliance. Once the sealant has been applied, device 10 may be attached thereto by sliding second end 14b of first portion 14 onto section 52 of conduit 50 and the applied RTV silicone sealant. After device 10 has been placed on section 52 of intake conduit 50, second portion 16, flapper 20 and mount 24 (flapper 20 and mount 24 are removed from FIG. 14 for clarity purposes) may be facing any direction; for example, a forward direction (e.g., a forward direction may be a direction that is in the same direction as a front side of an attached sealed combustion condensing appliance). It is understood that other techniques commonly known in the art may be utilized for connecting various conduits to each other.

After connecting device 10 to section 52 of intake conduit 50 attached to a sealed combustion condensing appliance, a cut interior end 58 of a section 56 of intake conduit 50 that is connected to an exterior air source may be connected to first end 14a of first portion 14. Prior to the application of any sealant to cut interior end 58, it should be ensured that the cut interior end 58 is capable of substantial free movement so as to facilitate connection with first end 14a. It may be necessary to loosen or adjust supports or hangers or straps restraining the cut interior end 58. Then, RTV silicone sealant may be applied to the cut interior end 58 of section 56 of intake conduit 50 connected to the exterior air source. After applying the sealant, cut interior end 58 may be inserted into first end 14a. This placement of cut interior end may be a delicate maneuver and may require a gentle insertion. For example, it may be necessary to support section 52 of the intake conduit 50 directly connected to the sealed combustion condensing appliance while inserting cut end 58 of intake conduit 50 into first end 14a. Once sections 52, 56 of conduit 50 have been inserted into device 10 and the sealant has cured, device 10 may be in operational connection with the conduit system of the sealed combustion condensing appliance.

Adjustment of Device 10

Once device 10 has been operationally connected to intake conduit 50 of a sealed combustion condensing appliance, flapper 20 may be adjusted for use in a particular operation of the sealed combustion condensing appliance. A first step in adjusting flapper 20 for proper operation is to test the flapper when conduit 50 is not blocked (i.e., in normal working condition). This step includes threadingly engaging threads of adjustment screw 22 and threads of adjuster hole 30, and rotating adjustment screw 22 through adjuster hole 30 until screw 22 is flush (or nearly flush) with flapper 20. Adjustment screw 22 may be inserted into adjuster hole 30 from front side 40 of flapper 20. Screw 22 may also be a self-tapping screw. When screw 22 has been completely inserted into adjuster hole 30, the sealed combustion condensing appliance should be turned on (or may be already running) and flapper 20 should be (or may be) in a slightly open position. If flapper 20 is in a closed position, the inserted screw 22 should be removed and a lighter screw should be inserted. If flapper 20 is in a slightly open position, unscrew the screw 22 (or rotate the screw 22 in a loosening direction) one rotation (for instance, or a fraction of a rotation if desired) at a time until flapper 20 is in a closed position. Screw 22 may be rotated in a gentle or cautious manner while repeatedly checking or monitoring the position of flapper 20 after each revolution, or part of a revolution, of screw 22. Multiple revolutions may also be used to make greater calibration changes. Once flapper 20 has been adjusted to a closed position, device 10 has been properly adjusted. In such calibrated state, slight changes in the pressure of the conduit may cause flapper 20 to rotate. If screw 22 is completely unscrewed without flapper 20 automatically positioning itself in a closed position, unscrew screw 22 and use a heavier screw. These steps may be repeated until a screw of an appropriate weight is found. The steps may be repeated until the appropriate depth or positioning of the screw is calibrated. Recalibration may be needed from time-to-time or in the event there are changes to the appliance such that the air pressures are altered.

Alternatively, or in addition to the above, a step in adjusting flapper 20 for operation may include threadingly engaging threads of adjustment screw 22 and threads of adjuster hole 30, and rotating adjustment screw 22 through adjuster hole 30 until screw 22 is flush (or nearly flush) with flapper 20. A self-tapping screw may alternatively be used. Adjustment screw 22 may be inserted into adjuster hole 30 from front side 40 of flapper 20. Then plug an exterior end of the section of the intake conduit connected to an exterior air source. The exterior end may be plugged by placing a plug, cap, tight-fitting cloth or other object over or in the exterior end. The object covering the exterior end may be any object connected in any manner that will not allow the object to be sucked into the conduit through the exterior end. The screwing of screw 22 and blocking of conduit 50 may be performed in any order without the order having a significant affect on the adjustment. During these steps, the sealed combustion condensing appliance may be turned off. After these steps have been completed, power to the sealed combustion condensing appliance may be restored. The sealed combustion condensing appliance may be allowed to start-up as it would under normal operations. When conduit 50 is completely blocked, flapper 20 should be in an open position. Flapper 20 may be in an open position any time it is not in a closed position, but flapper 20 may be in a completely open position when apron shoulder(s) 34c is/are in contact with external portion 24a of mount 24, or when it has rotated about axle 26 to a position between eighty-five (85) and eight-nine (89) degrees with respect to a closed position of flapper 20 or axis A (i.e., if axis B is substantially perpendicular to axis A). In alternative aspects flapper 20 may rotate at different degrees with respect to a closed position.

After properly adjusting flapper 20, the object plugging an exterior end of the intake conduit 50 may be removed. Once the object is removed, flapper 20 may be inspected to make sure flapper 20 is closed. When there is no object or other obstruction interfering with the exterior air intake conduit 50, an indicator on neck 36 of flapper 20 may be viewed indicating the sealed combustion condensing appliance and its exterior air intake conduit is operating properly. Further, flapper 20 may now be in a closed position or a slightly open position and flapper 20 may be substantially preventing air flow through mount opening 32.

The start-up of the sealed combustion condensing appliance may be accomplished by any method, which includes, but is not limited to, setting a thermostat to initiate start-up of the sealed combustion condensing appliance. Further, once a first set up step has been accomplished, a step may be to test the initial adjustment by performing the other test. That is, if flapper 20 was initially adjusted with a conduit 50 unblocked, test flapper 20 adjustment with a blocked conduit 50 and vice versa.

As the sealed combustion condensing appliance begins its operations, flapper 20 may be automatically adjusted to an open or closed position due to pressure levels in conduit 50 or other considerations. Flapper 20 may rotate to any number of positions. Flapper 20 may be considered to be in an open position when air is flowing through mount opening 32. Flapper 20 may be considered to be in a closed position when both apron 34 and apron riser 38 are in contact with mount 24. When flapper 20 is in a closed position, air may be substantially blocked from passing through mount opening 32. With section 56 of intake conduit 50 blocked, as the sealed combustion condensing appliance starts up and is operating, flapper 20 may be in a completely open position. As mentioned above, flapper 20 may be in a completely open position when it has rotated about axle 26 nearly eight-nine (89) degrees with respect to a closed position of flapper 20 or axis A, or apron shoulder 34c contacts exterior portion 24a of mount 24. In alternative aspects, flapper 20 may be in a completely open position at different angles of rotation. When flapper 20 is in a completely open position, a user may be able to view colored covered portion 38a as an indication that section 56 of intake conduit 50 is at least partially obstructed or is not taking-in a required amount of exterior air.

In operation, when an obstruction is present within intake pipe 50 or when air intake is otherwise minimized, apron 34 will automatically rotate in the direction of arrow A (See FIG. 8). The amount of rotation will depend upon the intensity of the pressure change caused by reduction of air flow and/or the degree of calibration due to the adjustment of adjust screw 22 which impacts the balance of flapper 20. In turn, apron riser 38 will rotate in the direction of arrow B, thus exposing or opening mount opening 32 to allow air to be introduced into the air intake tube of the appliance. The indicator placed upon covered portion 38a will then be generally visible, which indicates that exterior air-flow intake has been altered (reduced) and that air from the immediate surroundings of the appliance is being drawn into the intake tube of the appliance (e.g., air from the area within a basement will be drawn into the appliance). When the obstruction is removed from pipe 50 or altered so that additional or normal air flow is restored to intake pipe 50, apron riser 38 will rotate in a direction opposite arrow B to thereby close or reduce the opening of mount opening 32 (which stops or reduces introduction of air from the immediate surroundings of the appliance).

Such automatic adjustment to the air-flow intake will allow the appliance to continue operation. For instance, with some models, an appliance will automatically shut-off if the air intake is reduced to a particular level. Some appliances will attempt to restart or self-start periodically; however, if sufficient airflow is not restored by the time of the automatic re-start, the appliance will fail to operate or restart. Applicant believes that maintain a sufficient level of air intake to the apparatus will enhance efficiency of the device. With a more constant supply of intake air, the burner or flame will operate at a more efficient rate. When flapper 20 rotates to an open position, air enters through mount opening upper portion 33a (See FIG. 10). Note that when flapper 20 rotates to an open position, air may also enter mount opening lower portion 33 via passage behind apron 34. Finally, if the flapper 20 is in an open position when a back-fire or other pressure is released from the appliance, apron riser 38 of flapper 20 will be immediately forced to a closed position to prevent unwanted backfire or backdraft air from exiting mount opening 32 into the immediate area surrounding the appliance.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular AIR MODULATOR AND METHOD OF USING as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. An air flow modulating device for a sealed combustion condensing appliance, said device comprising:
    a first air flow intake path configured to communicate with an air source exterior to a structure containing the sealed combustion condensing appliance;
    a second air flow intake path configured to communicate with an air source interior to the structure containing the sealed combustion condensing appliance and further in communication with said first air flow intake path at a position prior to combustion within the sealed combustion condensing appliance; and
    a valve in communication with said second flow path, said valve adjusts from a first position corresponding to a first pressure level within said first air flow intake path to a second position corresponding to a second pressure level within said first air flow intake path.

2. The device of claim 1 where said valve is a mechanical valve and automatically moves from said first position to said second position in response to a change in pressure level from the first pressure level to the second pressure level.

3. The device of claim 2 where said valve comprises a mount having an opening and a flapper which rotates in relation to said mount.

4. The device of claim 3 where said flapper extends through said opening.

5. The device of claim 3 where said flapper has an apron that engages an exterior portion of said mount and an apron riser that engages an interior portion of said mount when said valve is in a closed position.

6. The device of claim 5 where said apron includes an adjuster.

7. The device of claim 3 where said mount comprises an axle, said flapper rotates about said axle.

8. The device of claim 7 where said axle in part defines a mount opening upper portion and a mount opening lower portion.

9. The device of claim 7 where an area defined by said mount opening upper portion is greater than an area defined by said mount opening lower portion.

10. The device of claim 1 where said first air flow intake path is positioned in communication with an external air path of a sealed combustion condensing appliance.

11. The device of claim 1 further comprising a sealed combustion condensing appliance, said first air flow intake path positioned in communication with an external air path of said appliance.

12. The device of claim 3 where said flapper includes an indicator.

13. A method of modulating air flow to a sealed combustion condensing appliance utilizing the device of claim 1.

14. The method of claim 13 where said first air flow intake path is in communication with an air source exterior to the appliance and where a second flow of air to the appliance is provided in response to a change in the amount of air flow from a first air flow.

15. An air flow modulating device for a sealed combustion condensing appliance of the type having a non-metal air intake conduit, said device comprising:
    a first plastic conduit portion defining a first combustion air flow intake path configured to communicate with an air source exterior to a structure containing the sealed combustion condensing appliance;
    a second plastic conduit portion defining a second combustion air flow intake path configured to communicate with an air source interior to the structure containing the sealed combustion condensing appliance and further in communication with said first combustion air flow intake path; and
    a valve in communication with said second flow path, said valve configured to automatically open from a first closed position corresponding to a first pressure level within said first combustion air flow intake path to a second open position corresponding to a second pressure level within said first air flow intake path.

16. The device of claim 15 where said valve includes a mount, said mount configured to insert into said second plastic conduit portion.

17. The device of claim 15 where said valve includes a mount, said mount connected to an end of said second conduit portion.

18. An air flow modulating device for a sealed combustion condensing appliance of the type having a non-metal air intake conduit in communication with an intake air source exterior to a structure containing the sealed combustion condensing appliance and an exhaust conduit in communication with an exterior of the structure for release of exhaust from the appliance, said device comprising:
    a first air flow intake path configured to communicate with the air intake source exterior to the structure containing the sealed combustion condensing appliance;
    a second air flow intake path configured to communicate with an air source interior to the structure containing the sealed combustion condensing appliance and further configured to communicate with said first air flow intake path at a position prior to entry of air from said second air flow intake path into a combustion area of the appliance; and a valve in communication with said second flow path, said valve adjusts from a first position corresponding to a first pressure level within said first air flow intake path to a second position corresponding to a second pressure level within said first air flow intake path.

19. The device of claim 18 where said first air flow intake path is defined by an intake conduit, said intake conduit configured to receive intake air from external the structure.

20. The device of claim 1 where said first air flow intake path is configured such that external air received at said first air flow intake path combines with air from said second air flow intake path prior to entry of the combined air into a combustion area of the appliance.

\* \* \* \* \*